(12) United States Patent
Wise et al.

(10) Patent No.: US 11,330,833 B2
(45) Date of Patent: May 17, 2022

(54) SYSTEM FOR DELIVERY OF BIOLOGICS

(71) Applicants: David J. Wise, Stoneville, MS (US); Gary Daniel Chesser, Starkville, MS (US); John Wesley Lowe, Houston, MS (US); Todd Byars, Belzoni, MS (US); Terrence Greenway, Stoneville, MS (US); Jeremiah Davis, Auburn, AL (US); Joseph Purswell, Starkville, MS (US)

(72) Inventors: David J. Wise, Stoneville, MS (US); Gary Daniel Chesser, Starkville, MS (US); John Wesley Lowe, Houston, MS (US); Todd Byars, Belzoni, MS (US); Terrence Greenway, Stoneville, MS (US); Jeremiah Davis, Auburn, AL (US); Joseph Purswell, Starkville, MS (US)

( * ) Notice: Subject to any disclaimer, the term of this patent is extended or adjusted under 35 U.S.C. 154(b) by 273 days.

(21) Appl. No.: 16/062,580

(22) PCT Filed: Dec. 14, 2016

(86) PCT No.: PCT/US2016/066728
§ 371 (c)(1),
(2) Date: Jun. 14, 2018

(87) PCT Pub. No.: WO2017/106386
PCT Pub. Date: Jun. 22, 2017

(65) Prior Publication Data
US 2018/0368464 A1    Dec. 27, 2018

Related U.S. Application Data

(60) Provisional application No. 62/267,187, filed on Dec. 14, 2015.

(51) Int. Cl.
*A23N 17/00* (2006.01)
*A01K 5/00* (2006.01)

(52) U.S. Cl.
CPC ............ *A23N 17/001* (2013.01); *A01K 5/002* (2013.01); *A01K 5/005* (2013.01); *A23N 17/00* (2013.01); *A23N 17/007* (2013.01)

(58) Field of Classification Search
CPC .... A23N 17/001; A23N 17/00; A23N 17/007; A01K 5/002; A01K 5/005
See application file for complete search history.

(56) References Cited

U.S. PATENT DOCUMENTS

| | | | | |
|---|---|---|---|---|
| 5,353,745 A | * | 10/1994 | Fahs, II | A01K 63/003 119/226 |
| 8,827,542 B2 | * | 9/2014 | Bachman | A01K 5/0216 366/160.1 |
| 2005/0077389 A1 | * | 4/2005 | Lebeda | A01D 43/14 239/302 |

OTHER PUBLICATIONS

Automated Process Equipment Corporation, "One Source for Animal Feed Solutions", Oct. 17, 2015; https://web.archive.org/web/20151017035233/http://apecusa.com/10-apec-english/animal-feed.html (Year: 2015).*

* cited by examiner

*Primary Examiner* — Ryan J. Walters
(74) *Attorney, Agent, or Firm* — Conley Rose, P.C.

(57) ABSTRACT

The invention consists of novel systems and methods for mixing and/or applying biologies including live biologies and/or any additive having therapeutic or growth promoting value with and/or to animal feed, thereby creating treated animal feed, and for delivering such treated animal feed to animals in need via a delivery system. The invention also (Continued)

provides a system and method to treat seed with biologies prior to or contemporaneously with packaging, storing, and/or planting.

17 Claims, 2 Drawing Sheets

Figure 1

SYSTEM FOR DELIVERY OF BIOLOGICS

CROSS-REFERENCE TO RELATED APPLICATION

This application claims priority from U.S. Provisional Patent Application Ser. No. 62/267,187 filed Dec. 14, 2015. The entirety of the provisional application is incorporated herein by reference.

STATEMENT OF GOVERNMENT SUPPORT

This invention was made with government support under grant 0228389 awarded by the National Institute of Food and Agriculture, U.S. Department of Agriculture. The government has certain rights in the invention.

FIELD OF THE INVENTION

This invention relates to the field of animal science and, more specifically, to novel systems and methods for mixing biologics, such as vaccines or anything of therapeutic value or growth-promoting value, with feed for delivery to animals such as fish, swine, poultry, cattle, and any other animal. The invention also discloses the mixing of such biologics for treating seeds prior to packaging, storing, and/or planting.

BACKGROUND OF THE INVENTION

The present invention provides a new system and method for delivering biologics with feed to animals such as fish. Other methods to deliver biologics to animals exist; however, the system and method of the present invention discloses a novel application allowing for the precise mixing of biologics, such as vaccine, with animal feed at delivery. This allows for the timely onsite delivery of time sensitive biologics to animals and/or plant seeds in need thereof. The present invention provides such a novel delivery system. It also provides for the delivery of biologics to seed prior to and/or contemporaneously with the delivery of seed to packaging, storing, and/or planting of the treated seed.

SUMMARY OF THE INVENTION

The present invention provides novel systems and methods of mixing biologics, including live biologics and/or any additive having therapeutic or growth promoting value, with animal feed and of delivering biologics, such as vaccines, to animals via a delivery system to the animals. The invention can be used with any animals, specifically fish, in need of such treatment. The invention discloses methodology that involves the delivery of biologics to animals with and/or as an integral part of animal feed. The system of the invention also includes methodology for delivery of biologics to seed prior to and/or contemporaneously with packaging, storing, and/or planting of the treated seed.

With the foregoing and other objects, features, and advantages of the present invention that will become apparent hereinafter, the nature of the invention may be more clearly understood by reference to the following detailed description of the invention and to the appended claims.

BRIEF DESCRIPTION OF THE DRAWINGS

The drawings shown in the specification accompany the detailed description of the invention and are intended to illustrate further the invention and its advantages. The drawings and figures, which are incorporated in and form a portion of the specification, illustrate certain preferred embodiments of the invention and, together with the entire specification, are meant to explain preferred embodiments of the present invention to those skilled in the art. Relevant FIGURES are shown or described in the Detailed Description of the Invention as follows:

Figure 1:
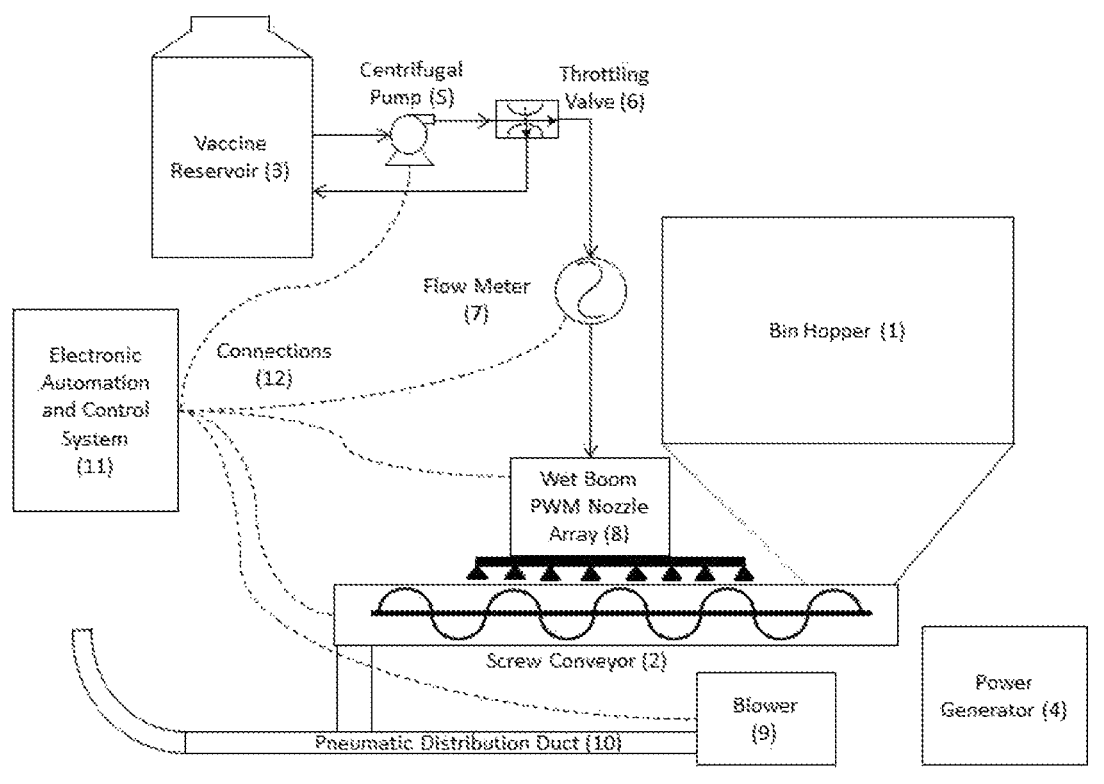

FIG. 1 depicts the system and method of the present invention.

DETAILED DESCRIPTION OF THE INVENTION

Figure 2:
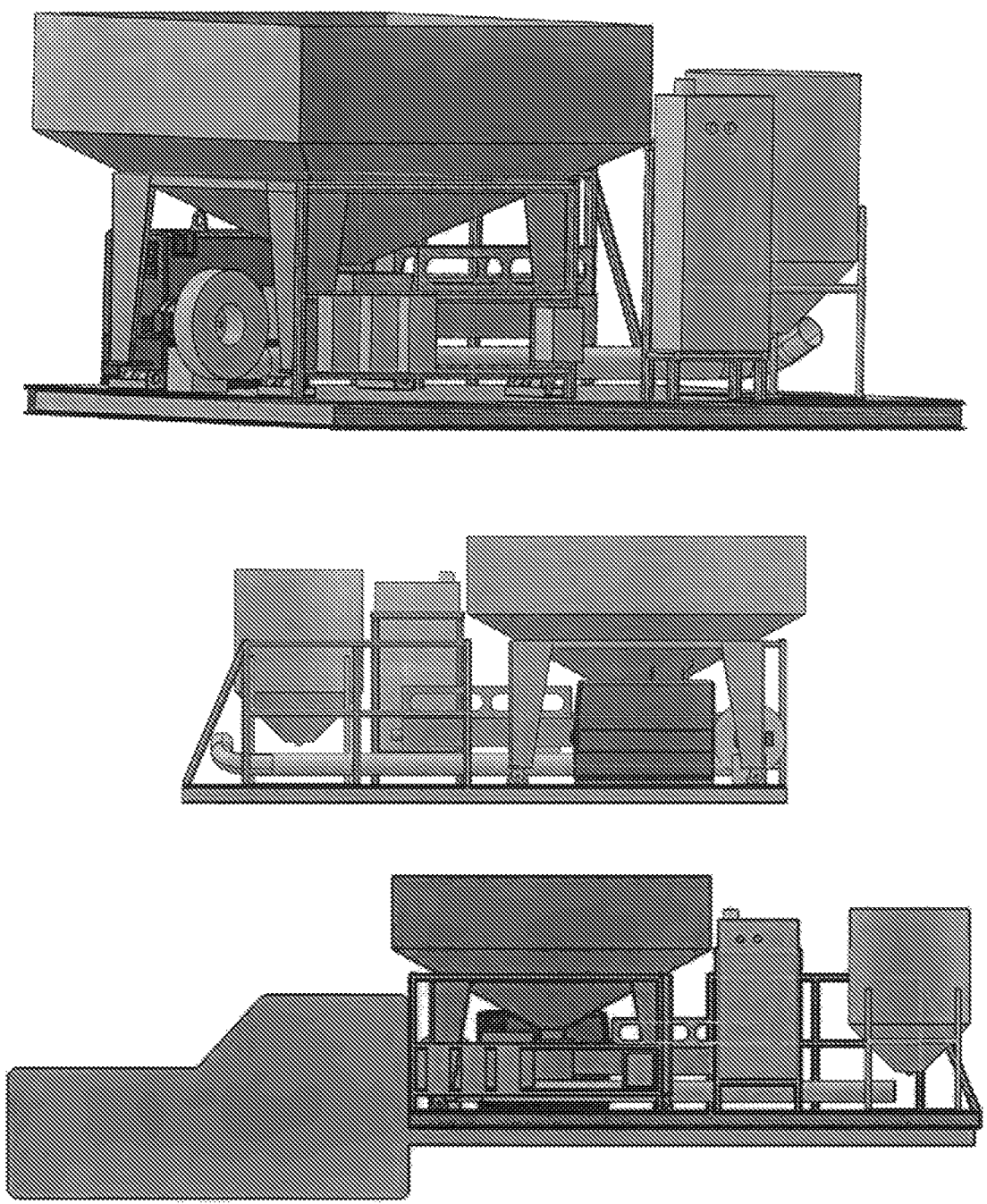
FIG. 2 depicts multiple pictorial views of the prototype of the system and method of the present invention.

In aquaculture, vaccines are increasingly being developed as alternatives to medicated feed to control disease. In addition, there is increasing interest in the use of pre- and probiotics for inclusion as feed additives in pelleted food for growth enhancement in animal agriculture. Delivery of biologics via feed eliminates the stress and challenges of handling or crowding animals commonly associated with other delivery routes, however, not all biologics can be mass delivered orally. While some of these biologics, such as killed vaccines, are very stable under adverse conditions and can be prepared in bulk and stored for long periods of time, live attenuated vaccines, for example, are quickly killed with even short periods of storage, desiccation, and increases in temperature, rendering the vaccine useless. Similarly, cooking, extruding, drying, and pelletization processes used to produce pelleted feeds inactivates many biologics eliminating their therapeutic benefits and prevents bulk manufacturing at the feed mill. Application of precisely-metered dosages at the point of feeding can enable oral delivery of any biologic (vaccines, pre- and probiotics, antibiotics, feed additives, etc.) without destroying the organism or biologic activity, thereby preserving their therapeutic or immunological value. The present invention provides systems and methods that enable delivery of precise dosages of biologics on feed (pelleted or extruded) and that also deliver biologics to seed. The invention demonstrates systems and methods that enable using a live attenuated vaccine to treat enteric septicemia of catfish (ESC), for example.

ESC is caused by the bacterium *Edwardsiella ictaluri* and is one of the most costly diseases for the U.S. channel catfish industry (between $30 and S60 million annually). Traditionally, the disease has been controlled with restricted feed practices and medicated feed. A vaccine is commercially available but has not gained industry acceptance due to marginal effectiveness and economic returns. To conform to industry practices, fish must be vaccinated as fry (7-10 days of age) when they are transferred from the hatchery to nursery ponds. The young age of fish at vaccination is thought to be the primary cause of limited effectiveness. To improve vaccine efficacy, a live attenuated strain of *E. ictaluri* was developed for oral delivery to allow for the in-pond vaccination of older, fully immunocompetent fish. Oral vaccination with vaccine-laden feed pellets showed that survival increased from about 38% to about 70%, increasing biomass production from about 725 to about 1,638 lb per acre, according to test results in one instance. While the developed vaccine and in-pond oral vaccination protocol dramatically improved survival and production efficiency, a standardized method for uniform and efficient mixing and delivery of the vaccine feed admix to animals on a larger scale needed to be developed for commercial application.

The present invention was developed to provide such a system and method for applying precisely-metered dosages of biologics, such as live biologics (catfish vaccine, for example), to pelleted feed at the point of feeding and then delivering the medicated/treated feed to fish in ponds. The mobile platform of the present invention is self-contained, computer-controlled and monitored, and powered locally and/or remotely and can be mounted on a mobile vehicle such as a flatbed truck or pulled behind on a trailer, for example.

Successful and efficient immunization of commercially-raised catfish is dependent on the vaccine delivery system and method of the present invention. Without this novel biologics treatment application and delivery system, vaccines would have little practical value in catfish aquaculture. As such, commercial value exists in both the development of the invention and as a service to commercial catfish growers. In field vaccination trials involving four (4) commercial catfish fingerling operations and 56 nursery ponds (approximately 40 million catfish), the vaccine was shown to deliver precise doses over 56 different applications. The mean delivered dose was 7.28+0.021 g/feed (log 10, mean+S.E.) and resulted in dramatic increases in production efficiencies. Vaccination decreased feed conversion ratios, increased survival and fish size, and increased gross fish sales by $3.000 per acre. Based on the current fingerling acreage and value to producers, the vaccination and delivery platform of the present invention as a delivered service can generate an estimated $2 million in gross sales. Moreover, in addition to its application in the fish and catfish culture, the vaccine delivery system of the invention can be employed to deliver vaccines or other biologics in a host of other animal production and aquaculture production systems for salmonids (salmon and trout), zebra fish, tilapia, and the like, for example. The control system, metering system, and vaccine mixing/treated feed delivery system of the present invention can be used to apply metered dosages of biologics and live biologics in particular to nearly any pelleted feed in a myriad of confined animal production systems, for example, including but not limited to swine, poultry, and cattle. Additionally, the invention can be used as a system to treat seed with biologic material prior to and/or contemporaneously with the seed being packaged, stored, transported, and/or planted.

General Description

The vaccination delivery system of the present invention applies biologics including live biologics, such as attenuated enteric septicemia of catfish (ESC) vaccine for example, directly to animal feed, including pelleted and extruded feed, in a continuous, variable-rate process, and subsequently applies or delivers the biologics/vaccine/feed mixture to an animal or animals in need, such as fish, swine, poultry, and cattle, for example. The invention was initially tested using live attenuated vaccine mixed with feed and delivered to catfish. For purposes herein, the terms 'biologics' and 'vaccine' are used interchangeably and the terms 'feed', 'pelleted feed', and 'seed' are likewise used interchangeably. Biologics is defined as medicinal therapeutic preparations from living organisms and their products including vaccines, serums, toxins, anti-toxins, blood and its components, allergenics, somatic cells, gene therapies, tissues, recombinant therapeutic proteins, analogous microbial products, bioengineered therapeutic agents (hormones, antibodies, and/or cytokines) produced in bacteria, animals, and other organisms, and the like, composed for example of sugars, proteins, or nucleic acids or complex combinations thereof, that are applicable to the prevention, treatment, and/or cure of diseases or injuries, and as may be applied to animals and/or seed. All parameters presented herein including, but not limited to, temperatures, pressures, times, sizes, amounts, ratios, weights, and/or percentages, for example, represent approximate values. References to 'a' or 'an' concerning any particular item, component, material, or product is defined as at least one and could be more than one.

Pelleted or other type of feed placed and/or stored in a feed or seed hopper bin or container is gravity-fed into a conveyor, or screw conveyor or other similar type of conveyor, which acts as a continuous flow mixing chamber. Biologics including vaccine can be applied through a spray nozzle array aligned axially with the screw or similar conveyor and centrally located above the conveyor mixing chamber. The biologics/vaccine application system is comprised of at least one of each of a: biologics and/or vaccine reservoir, pump, flow control valve and meter, and spray nozzle and/or array. The biologics/vaccine application rate is modulated in response to the feed/pelleted feed or the seed flow rate to maintain the optimal or desired biologics/vaccine application rate (volume biologics/vaccine: mass of feed, mL/kg). As pelleted feed flows through the conveyor, biologics/vaccine is applied and the feed is mixed for even distribution and vaccine uniformity. The conveyor drops vaccine-laden pelleted feed into a pneumatic or similar distribution duct. Air is supplied to the distribution duct with a blower, although a blower alternatively is not a requirement. For seed applications, a blower may or may not be utilized. In one embodiment, vaccine-laden feed is propelled through the air and delivered thereby to the animal(s) and the delivery rate is controlled by conveyor speed. The trajectory of the vaccine-laden feed throughout the delivery can be controlled through rotation of the distribution duct, as necessary, with a linear or similar type of actuator and the blower to control airflow rate. Alternatively, the system may include a feed/biologics propulsion system consisting of a blower/rotary airlock system, or any blower-based device mounted in-line, for example, with the distribution ducting. All components of the invention described herein comprise at least one, and possibly more than one, of each component.

System 1:

The System 1 biologic/vaccine application system embodiment was initially designed and intended to be a variable rate application system. However, the variable rate control system was subsequently bypassed due to performance limitations, including those of the spray component of the modulating valve and diaphragm pump. The vaccine rate was manually adjusted to a single rate for completion of field trials and validation of efficacy.

System 2:

The System 2 embodiment variable rate application system was designed, built, and upgraded based on the System 1 embodiment design and performance limitations. System 2 spray flow capacity and rate control were optimized through the utilization of a centrifugal pump, spray control valve, PID (proportional integral derivative) controller, and inline flow meter for precise monitoring and system regulation. Comparison of flow meter and screw conveyor signals in the PID controller triggered the flow control valve to open or close (shut) to adjust vaccine delivery and provide precise dosage control as the feed delivery rate was varied.

Limitations observed concerning System 2 included: (1) slow response of variable rate system when making large adjustments in feed delivery rate due to the nature of the PID controller; (2) friction created within the vaccine delivery system at low feed delivery rates caused an increase in vaccine solution temperature which decreased vaccine viability and efficacy; and (3) moistened feed bridging in the rotary airlock and pneumatic conveyance system required frequent cleanout during operation. A pneumatic cleanout system consisting of airline ports/directional tips located on both sides of a drop box were installed to supply high-pressure compressed air directly on the air lock flights to prevent bridging of moistened treated feed. Air flow was controlled by a value that was opened manually at timed intervals. Similarly, a solenoid could be used to operate the valve.

System 3:

The delivery system of the invention applies biologics/vaccine directly to feed, such as pelleted feed, at precise volumes in a continuous, variable rate process to deliver a targeted dose. The system provides a means for and allows the efficient application of biologics to animal feed and to seed in a continuous, variable-rate process allowing for onsite delivery of time-sensitive biologics and thereby creating treated animal feed and seed. The invention further provides a means of delivering the treated animal feed to an animal in need and of delivering treated seed to be planted, transported, and/or stored. FIG. 1 shows a schematic layout of the system of the present invention. Each component shown may comprise at least one of each component.

Pelleted feed is stored in a bin, container, or similar hopper (1). Pelleted feed is fed from the bin hopper (1) into a conveyor (2) or screw conveyor, for example, or similar device with a least one variable frequency drive (VFD). Component motors controlled through the VFD in System 3 include the conveyor (2), blower (14), and pump (5) or centrifugal pump, for example. In an alternative embodiment, the conveyor (2) is instead a mixing system or device, or the feed does not go through (bypasses) the conveyor (2). Also alternatively, the variable flow system of the invention is instead a pressure flow type of system. Herein the term 'vaccine' and 'biologics' are meant to be the same and are used interchangeably. Vaccine is applied to the feed using a variable rate spray system comprised of at least one of each of a: reservoir (3) for containing biologics, for example; pump (5), such as a centrifugal pump; throttling valve (6) for controlling biologics delivery system pressure and to provide biologics reservoir (3) agitation and mixing; in-line flow meter (7) for monitoring and precise control of biologics delivery to animal feed; a spray nozzle array (8), having at least one outlet nozzle for applying the biologics to the animal feed or the seed in the conveyor, where the nozzle array is a wet boom pulse width modulated (PWM) nozzle array, for example (which varies the flow of biologics through the nozzles for uniform biologics delivery to animal feed and/or seed); and a means of real time control utilizing a computer-based electronic automation and control system (11) (for programmable automation and control) connected to and for controlling the spray nozzle array (8), the flow meter (7), and/or the conveyor (2) via control connection(s) (optical, for example) and/or wiring (12). The spray nozzle array (8), which is comprised of at least one outlet nozzle for applying the biologics to the animal feed or seed in the conveyor (2), is modulated in response to pelleted feed flow rate to maintain desired or optimum vaccine application rate (volume of vaccine: mass of feed, mL/kg). It should be understood that other spray nozzle arrays can be used in the system design. The conveyor (2) drops vaccine-laden pelleted feed into the pneumatic distribution duct (10). Air or an appropriate gas is supplied to the distribution duct (10) with an industrial blower (9), such as a centrifugal blower, or similar feed/vaccine product mover. System 1 and System 2 uses an industrial positive displacement blower, while System 3 uses a centrifugal or similar type of blower to eliminate the airlock and to solve the "bridging" and clean out issues of Systems 1 and 2. In an alternative embodiment, a blower is optional. Vaccine-laden feed is propelled through the air and delivered to the animal(s), whereby the delivery rate is controlled by the conveyor (2) speed. The trajectory of the vaccine-laden feed is controlled through the blower (9) speed which governs airflow rate. In application where broadcast delivery in not desired, pneumatic conveyance may not be needed and the coated material can be collected for the desired application.

The system is locally powered with a suitable power generator (4), such as an AC source or DC source of power produced by a gasoline-powered electrical generator, for example. The system can also be powered by other suitable power sources such as electric over hydraulic.

In the System 3 embodiment of the invention, an electronic automation and control system (11) (FIG. 1) utilizes a programmable logic controller (PLC) system to enable a rapid, efficient, and more precise response to vaccine dosage in feed delivery rate and to record and display system performance parameters (feed rate, flow rate, feed ratio, application monitoring, and similar data, for example). Other features may include at least one of each of the following: (1) a generator-powered ultra-cold freezer or similar chiller or refrigeration device to maintain integrity of the frozen vaccine prior to use; (2) a submersible water or similar type of chiller or refrigeration device to maintain temperature of the vaccine reservoir; (3) a conveyor system comprised of non-corrosive material such as stainless steel, or the like, to facilitate sanitation; (4) a quick connection between the distribution duct and blower system for routine cleaning; and (5) a water metering system to measure and/or control inflow when preparing the reservoir and to measure and/or control total outflow to monitor and control treated feed application volume from the distribution duct. These are optional components and are not necessarily required for the precision or the effectiveness of the invention.

Alternative system embodiments and features include a propulsion system consisting of a blower/rotary airlock system or any blower-type device mounted in-line, for example, with the distribution duct or device. Further, a conventional blower-type fan system can be used as the method of pneumatic conveyance, thus eliminating the rotary airlock, root blower, and the cleanout system of Systems 1 and/or 2. A variable speed control system may be used as well or the feed and vaccine/biologics and the rate of application thereof may be controlled directly and/or indirectly by at least one VFD (variable frequency drive). FIG. 2 shows pictorial representations of different views of multiple embodiments of the present invention.

The System 3 variable rate application system was upgraded based on identified System 2 performance limitations. A complete Programmable Automation Controller (PAC) was incorporated as a centralized control and monitoring system for all input and output signals within the system of the invention. The PAC is in essence the electronic automation and control system (11) and includes wired and wireless network capabilities for local and remote control, adjustment, and diagnostics. All system inputs, all feedback, and outputs are controlled by the PAC. Signals provided by the PAC for the system include, for example: 1) Bin Scale Weight, 2) Vaccine (biologics) Temperature, 3) Motor Control Variable Frequency Drives (VFDs) (screw) conveyor (2), blower (9), and (centrifugal) pump (5) have separate VFDs), 4) Vaccine (biologics) Delivery Flowmeter, and 5) Vaccine (biologics) System Pressure.

The operator/system control interface was upgraded to an optional programmable touchscreen Human Machine Interface (HMI) connected to the system's wired network, capable of displaying and recording any and all system parameters and functions. The electronic computer-based automation and control system and means (11) provides for real time display and recording of, and an audio, video, or both, display of, performance parameters of the system. Moreover through the HMI, which is typically a part of the electronic automation and control system (11), the system operator is capable of locally or remotely monitoring or operating system functions and adjustments including, but not limited to: 1) feed rate, 2) blower/fan speed, 3) vaccine (or biologics) system pressure, 4) vaccine temperature, 5) vaccine flow rate, 6) scale functions, such as zero and tare, for example, and 7) feed (or seed) and vaccine applied. Additionally, the HMI provides recording capabilities of global positioning system (GPS) location and time-stamped data of all system parameters for system management and documentation.

The PID controller and flow control valve were identified in System 2 as components that limited precise, instantaneous, and variable rate vaccine dosage changes. In System 3, the System 2 PID controller and flow control valve were replaced with a Pulse Width Modulated (PWM) controller. The PWM system is infinitely variable and controls the flow rate of the biologics or vaccine by adjusting duty cycle and cycling frequency by pulsing each spray nozzle on and off to achieve a targeted flow rate, resulting in precise biologics or vaccine dosages applied to the feed and instantaneous adjustments if needed. The PAC receives a signal from the VFD of the conveyor (2), then calculates the desired vaccine delivery rate. The PAC then compares the actual and calculated (desired) vaccine delivery rate with a signal from the in-line flow meter for vaccine application and immediately sends a signal to the PWM controller that precisely adjusts the PWM duty cycle accordingly. The PAC and the PWM are part of the electronic automation and control system (11) shown in FIG. 1.

Plugging and bridging of the vaccine-laden feed in the rotary airlock component and the discharge piping of the pneumatic conveyance system proved to be problematic in System 2. To overcome this limitation, a blower (9), or similar blower system such as a centrifugal blower, was utilized that allowed the vaccine-laden treated feed to drop from the conveyor (2) directly into the high-velocity discharge airstream in the pneumatic distribution duct (10), thereby omitting the need for the rotary airlock and eliminating system bridging and plugging problems. System 3 improvements proved to be invaluable to overall system performance, control, and reliability. Moreover, the invention may also be utilized as an add-on type of delivery system to an existing system that treats and delivers feed and/or seed with biologic treatment(s), so that what is fed or applied to animals or applied to seed is enhanced by the invention. The novelty of the invention lies also in the accuracy, precision, and efficiency with which biologics and material can be monitored, controlled, changed, and interchanged and therefore delivered in treated form.

Additional Applications of the Delivery System of the Invention

Seed Application:

Production agricultural seed is typically treated or coated with various substances for the purpose of disease prevention and for improving germination and vigor, thus enhancing crop performance and production. Typical methodologies for applying seed coatings include treating the seeds in batch form by means of a stationary treatment plant before loading the treated seeds into bulk containers or bags. Bulk treated seed is often stored in warehouses for extended periods of time before being transported to the field for planting. This method may be feasible for non-biological treatments. However, efficacy of biological treatment agents degrade over time, thus reducing the effectiveness of biologically-treated seeds stored for long periods of time. The system of the present invention can therefore be effectively adapted/retrofitted and utilized to apply biologics directly to seed at field side immediately before planting, improving the efficacy of the biological agent seed treatment. Treated seed may be planted or precision planted with a planter and/or loaded in a tender, for example, or could be blown in the tender.

Animal Feed Application:

As mentioned, the overall well-being and health in animal production systems necessitates the use of treating animal feed with antibiotics, probiotics, and other feed supplements/additives. Current methodologies of application of the aforementioned are typically limited to the point-of-production for the animal feed at a feed mill. Once manufactured, treated/medicated feed must then be transported to the point of use and placed in the correct bin to ensure that the treated feed reaches the target animal(s). Additionally, should the treated feed prove to be ineffective in treatment, it must either be fed until completely consumed or removed and replaced with a different treated batch. This current system of feeding creates inherent risk in respect to ensuring correct delivery to target animals, limits the ability to easily/rapidly change or adjust medication strategies should the treatment prove to be ineffective, and it is not conducive to the use of live biological or time-sensitive treatments. The current embodiments of the delivery system of the invention are easily adapted/modified to be implemented in current swine, poultry, beef, and other animal feeding systems, allowing for the use of live biological treatments and also allowing for the ability to change, alter, and/or amend antibiotics, probiotics, and other feed supplements/additives at the point-of-use, thereby lessening the potential for incorrect feeding and providing a means to rapidly adjust feed inclusions based on animal needs/responses. Another embodiment of this novel technology employs a version of the current vaccine delivery system of the invention placed in-line between the feed storage bin and feed distribution lines, providing one or more points to deliver antibiotics, probiotics, and other feed supplements/additives to the feed stream on an as-needed basis.

Pneumatic Distribution of Treated Material:

The present invention provides a novel application, mixing, and delivery system for applying biologics to animal feed or seed in a continuous and variable rate manner. The pneumatic conveyance system described herein is specifically inherent to the application of providing vaccine-laden pelleted feed to pond-raised fish. Other applications of this invention may not specifically require pneumatic conveyance of the treated product. The effectiveness of the invention to apply biologics directly to animal feed or seed in a continuous and variable rate manner is not limited by the method of conveyance of the treated feed or seed product. Depending on the application characteristics and needs, other methods of treated product distribution, such as gravity flow or mechanical conveyance, could be adapted and used successfully with the present invention as well.

The above detailed description is presented to enable any person skilled in the art to make and use the invention. Specific details have been revealed to provide a comprehensive understanding of the present invention, and are used for explanation of the information provided. These specific details, however, are not required to practice the invention, as is apparent to one skilled in the art. Descriptions of specific applications, analyses, and calculations are meant to serve only as representative examples. Various modifications to the preferred embodiments may be readily apparent to one skilled in the art, and the general principles defined herein may be applicable to other embodiments and applications while still remaining within the scope of the invention. There is no intention for the present invention to be limited to the embodiments shown and the invention is to be accorded the widest possible scope consistent with the principles and features disclosed herein.

While various embodiments of the present invention have been described above, it should be understood that they have been presented by way of example and not limitation. It will be apparent to persons skilled in the relevant art(s) that various changes in form and detail can be made therein without departing from the spirit and scope of the present invention. In fact, after reading the above description, it will be apparent to one skilled in the relevant art(s) how to implement the invention in alternative embodiments. Thus, the present invention should not be limited by any of the above-described exemplary embodiments.

The processes, systems, and methods of the present invention are often best practiced by empirically determining the appropriate values of the operating parameters, or by conducting simulations to arrive at best design for a given application. Accordingly, all suitable modifications, combinations, and equivalents should be considered as falling within the spirit and scope of the invention.

What is claimed is:

1. A system for delivery of biologics to animals, the system comprising:
    a means for applying biologics to animal feed in a continuous, uniform, controllable, variable-rate process allowing for onsite in field delivery of time-sensitive biologics and thereby creating treated animal feed; and
    a means for providing and delivering the treated animal feed to an animal in need thereof in a controllable, variable-rate process,
    wherein the biologics applied and delivered are temperature-sensitive biologics;
    wherein an amount of biologics applied to the animal feed is controlled to:
        allow for in field absorption of an adequate amount of the biologics into the animal feed to provide an effective dose to the animal; and
    wherein the system can make in field instantaneous changes in feed rates to adapt to animals' feeding preferences and rates of consumption.

2. The system of claim 1, wherein the means for applying biologics to animal feed and thereby creating treated animal feed comprises:
    a hopper for containing the animal feed;
    a reservoir for containing biologics;
    a conveyor for accepting the animal feed from the hopper and the biologics from the reservoir and for mixing an amount of biologics with an amount of animal feed;
    a pump for moving the biologics to the conveyor for mixing the biologics with the animal feed and thereby treating the animal feed;
    a throttling valve for controlling biologics delivery system pressure and to provide biologics reservoir agitation and mixing;
    an in-line flow meter for monitoring and precise control of biologics delivery to animal feed; and
    a spray nozzle array for uniform biologics delivery to the animal feed, wherein the spray nozzle array comprises at least one outlet nozzle for applying the biologics to the animal feed in the conveyor.

3. The system of claim 2, wherein the means for providing and delivering the treated animal feed comprises:
    a pneumatic distribution duct for accepting the treated animal feed from the conveyor; and
    a blower for providing air, gas, or a combination thereof, to and controlling the air, gas, or both, flow rate into the distribution duct and for blowing the treated animal feed out of the distribution duct through one open end of the distribution duct and thereby delivering the treated animal feed to the animal,
    wherein a rate of delivery of the treated animal feed to the animal is controlled by a speed of the conveyor.

4. The system of claim 3, further comprising a power generator for providing electrical power to the system.

5. The system of claim 4, further comprising at least one electronic computer-based automation and control means for controlling in real time the system.

6. The system of claim 5, further comprising one or more of a refrigeration device for maintaining temperature, relative humidity, or both, for maintaining integrity of the biologics, a chiller for maintaining a temperature of the biologics in the reservoir, a means of quick connection between the distribution duct and the blower for cleaning each component requiring cleaning, a means of measuring biologics inflow to the reservoir, and a means of measuring treated animal feed outflow application volume from the distribution duct.

7. The system of claim 6, wherein the conveyor is comprised of stainless steel.

8. The system of claim 5, wherein the electronic computer-based automation and control means comprises a programmable automation controller for providing an amount of biologics to the animal feed, for an amount of treated animal feed to the animal, and for providing a real time display and recording of, and an audio, video, or both, display of, system performance parameters, and an optional human machine interface (HMI) for displaying and recording any system parameter and function.

9. The system of claim 8, wherein the system performance parameters displayed and recorded are comprising one or more of animal feed and biologics applied, feed rate, blower or fan speed, biologics system pressure, biologics temperature, biologics flow rate, scale functions, and global positioning system (GPS) location and time stamped parameter data.

10. A system for delivery of biologics to seed, the system comprising:
    a means for applying biologics to seed in a continuous, uniform, controllable, variable-rate process allowing for onsite in field delivery of time-sensitive biologics and thereby creating treated seed, wherein the biologics applied and delivered are temperature-sensitive biologics;

wherein an amount of biologics applied to the seed is controlled to:

allow for in field coating of the seed with an effective amount of biologics; and wherein the system can make in field instantaneous changes in the amount of biologics applied to the seed.

11. The system of claim 10, wherein the means for applying biologics to seed and thereby creating treated seed comprises:

a hopper for containing the seed;

a reservoir for containing biologics;

a conveyor for accepting the seed from the hopper and the biologics from the reservoir and for mixing an amount of biologics with an amount of seed;

a pump for moving the biologics to the conveyor for mixing the biologics with the seed and thereby treating the seed;

a throttling valve for controlling biologics delivery system pressure and to provide biologics reservoir agitation and mixing;

an in-line flow meter for monitoring and control of biologics delivery to the seed; and a spray nozzle array for uniform biologics delivery to seed, wherein the spray nozzle array comprises at least one outlet nozzle for applying the biologics to the seed in the conveyor.

12. The system of claim 11, further comprising a power generator for providing electrical power to the system.

13. The system of claim 11, further comprising at least one electronic computer-based automation and control means for controlling in real time the system.

14. The system of claim 13, wherein the electronic computer-based automation and control means comprises a programmable automation controller for providing an amount of biologics to the seed, for delivering an amount of treated seed, and for providing a real time display and recording of, and an audio, video, or both, display of, system performance parameters, and an optional human machine interface (HMI) for displaying and recording any system parameter and function.

15. The system of claim 14, wherein the system performance parameters displayed and recorded are comprising one or more of seed and biologics applied, feed rate, biologics system pressure, biologics temperature, biologics flow rate, scale functions, and global positioning system (GPS) location and time stamped parameter data.

16. The system of claim 11, further comprising one or more of a refrigeration device for maintaining temperature, relative humidity, or both, for maintaining integrity of the biologics, a chiller for maintaining a temperature of the biologics in the reservoir, a means of quick connection between a distribution duct and a blower for cleaning each component requiring cleaning, a means of measuring biologics inflow to the reservoir, and a means of measuring treated seed outflow application volume from the distribution duct.

17. The system of claim 16, wherein the conveyor is comprised of stainless steel.

* * * * *